United States Patent
Fischer

(10) Patent No.: US 8,474,514 B2
(45) Date of Patent: Jul. 2, 2013

(54) CARRIER STRUCTURE FOR PARTITIONING AND/OR INNER PARTITIONING WITH INTEGRATED HEATING AND/OR COOLING

(75) Inventor: Thomas Fischer, Strasbourg (FR)

(73) Assignee: Jean-Eric Peugeot, Compiegne (FR)

( * ) Notice: Subject to any disclaimer, the term of this patent is extended or adjusted under 35 U.S.C. 154(b) by 651 days.

(21) Appl. No.: 12/523,408

(22) PCT Filed: Jan. 16, 2008

(86) PCT No.: PCT/FR2008/050075
§ 371 (c)(1),
(2), (4) Date: Jul. 16, 2009

(87) PCT Pub. No.: WO2008/107594
PCT Pub. Date: Sep. 12, 2008

(65) Prior Publication Data
US 2010/0071872 A1   Mar. 25, 2010

(30) Foreign Application Priority Data
Jan. 17, 2007   (FR) .......................... 07 52724

(51) Int. Cl.
*F24H 3/00* (2006.01)
*F24D 5/10* (2006.01)
*F24D 3/16* (2006.01)
*F28F 3/12* (2006.01)

(52) U.S. Cl.
USPC .................. 165/53; 165/47; 165/56; 165/168

(58) Field of Classification Search
USPC ...................... 165/47–57, 200–303
See application file for complete search history.

(56) References Cited

U.S. PATENT DOCUMENTS

| 3,033,533 | A | * | 5/1962 | Dieulangard | 165/56 |
| 4,373,573 | A | * | 2/1983 | Madwed | 165/236 |
| 4,572,864 | A | * | 2/1986 | Benson et al. | 428/305.5 |
| 4,646,814 | A | * | 3/1987 | Fennesz | 165/56 |
| 7,021,372 | B2 | * | 4/2006 | Pickard | 165/168 |
| 2004/0069447 | A1 | * | 4/2004 | Friedlich | 165/47 |
| 2006/0107603 | A1 | * | 5/2006 | Brownridge | 52/11 |

FOREIGN PATENT DOCUMENTS

| EP | 0022646 | * | 1/1981 |
| EP | 0022646 A1 | | 1/1981 |
| EP | 1457614 A1 | | 9/2004 |

OTHER PUBLICATIONS

International Search Report of PCT/FR2008/050075, Mailing Date of Jan. 5, 2009.

\* cited by examiner

*Primary Examiner* — Frantz F. Jules
*Assistant Examiner* — Henry Crenshaw
(74) *Attorney, Agent, or Firm* — Westerman, Hattori, Daniels & Adrian, LLP

(57) ABSTRACT

The invention relates to a carrier structure (1) for partitioning and/or inner partitioning with integrated heating and/or cooling.

The structure is characterized in that it comprises mounts (2) that can be fixed to the structure of a building and adapted for receiving a cladding (8); through chutes (5) formed so that they can be attached on said mounts (2); and a network of heating and/or cooling members (6) extending in a portion or the totality of said chutes (5).

The invention also relates to a mount and a chute for realizing such a structure, and to a partitioning or inner partitioning for implementing the same.

21 Claims, 4 Drawing Sheets

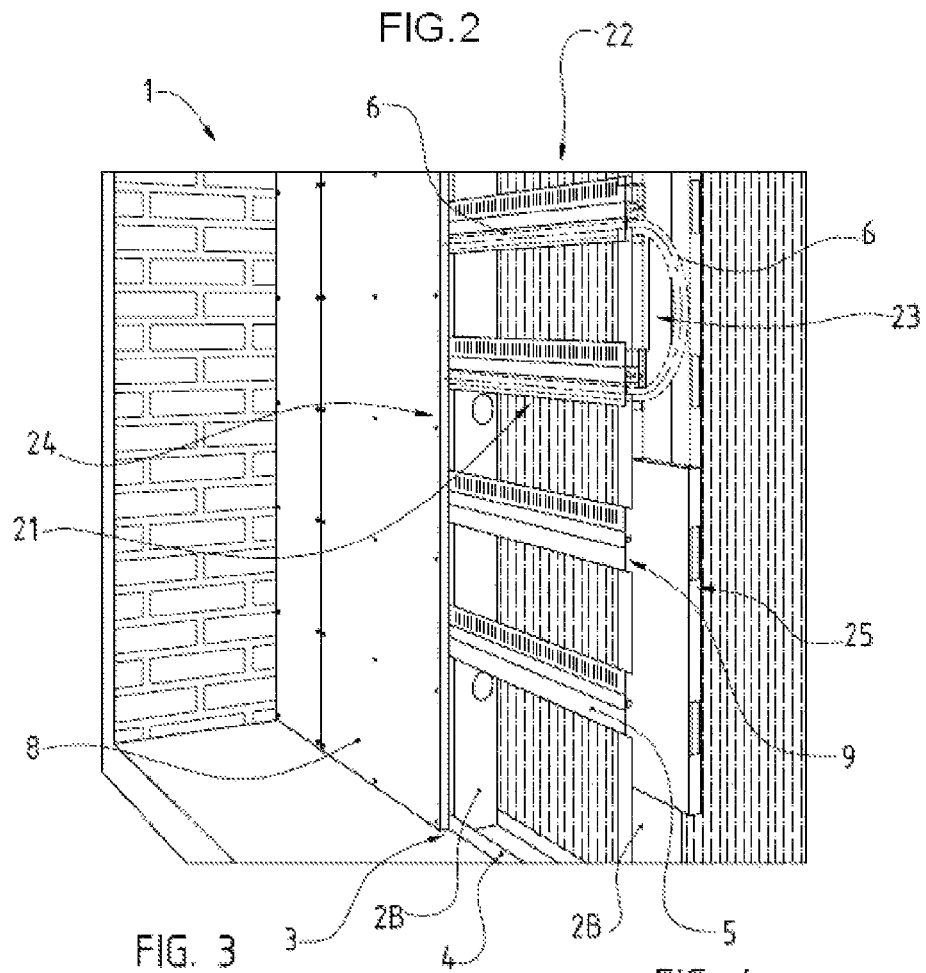
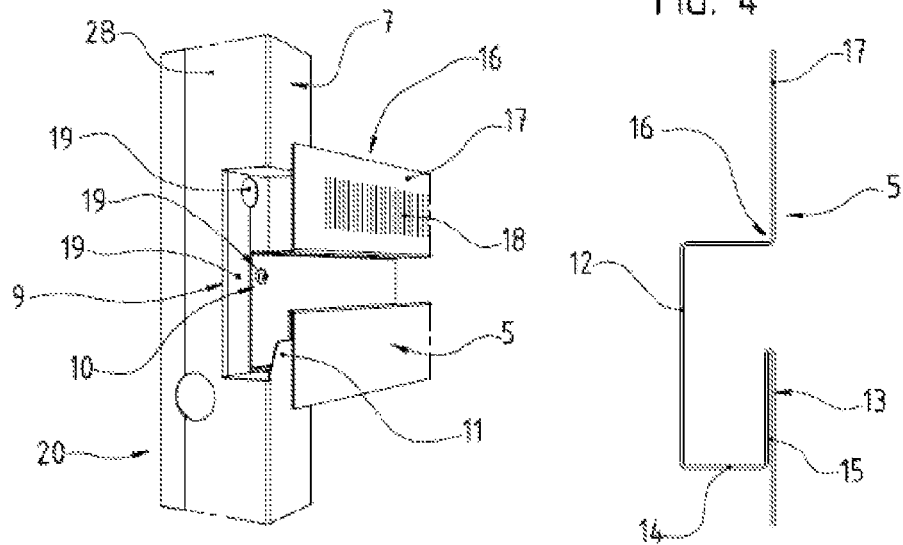

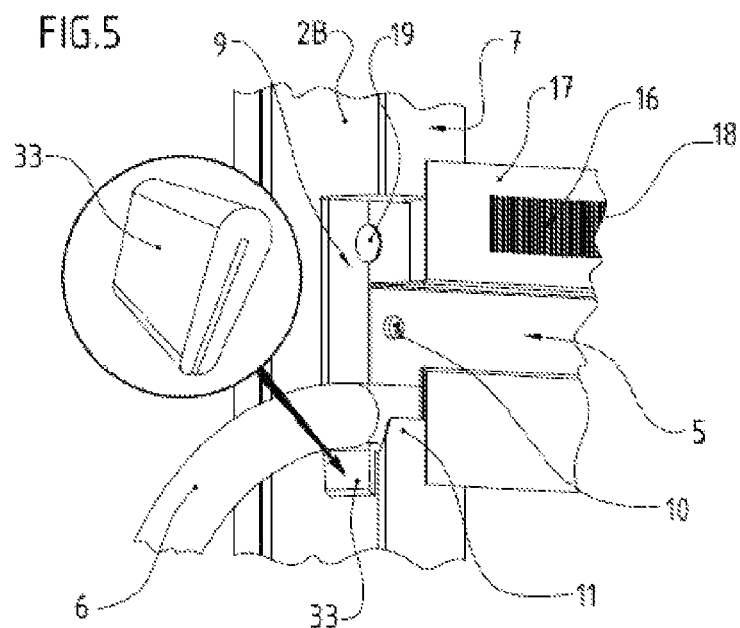
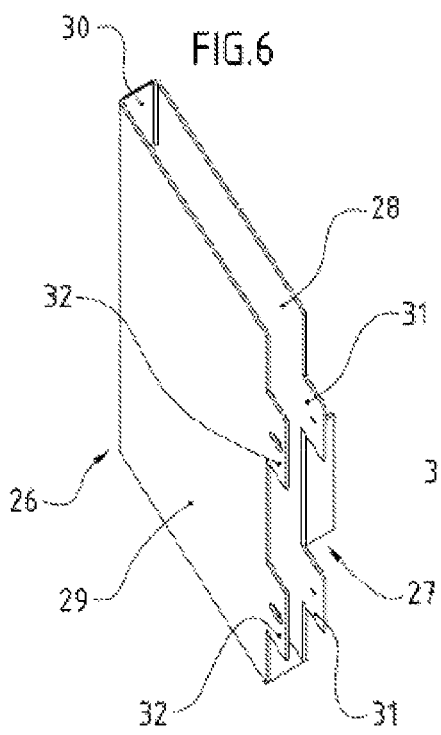
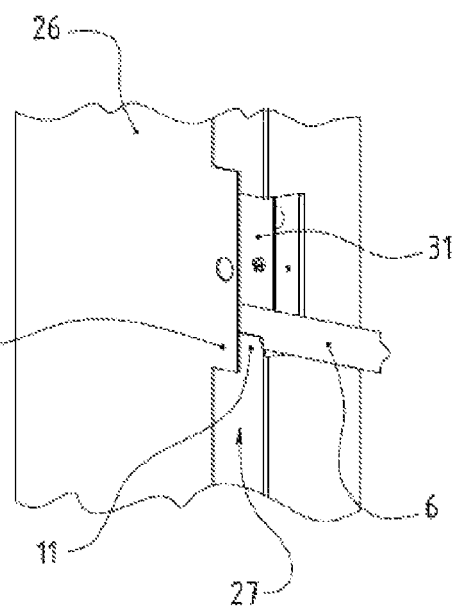

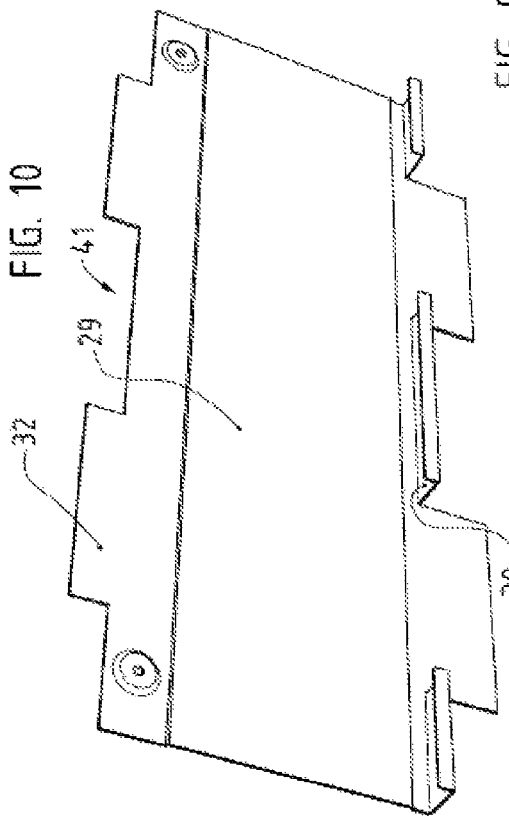
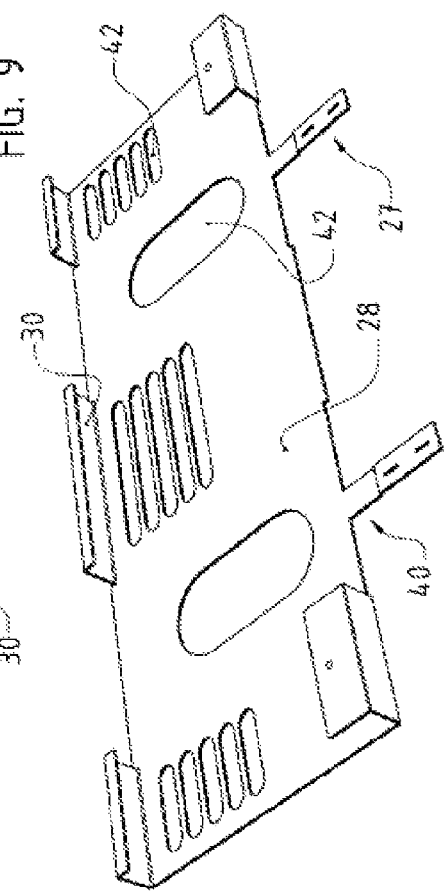
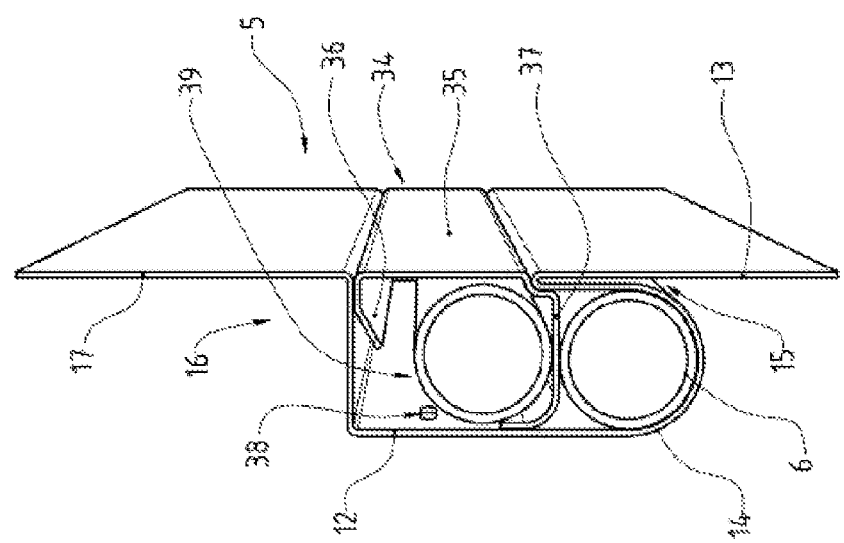

CARRIER STRUCTURE FOR PARTITIONING AND/OR INNER PARTITIONING WITH INTEGRATED HEATING AND/OR COOLING

BACKGROUND OF THE INVENTION (1) Field of the Invention

The invention relates to a carrier structure for partitioning and/or inner partitioning with integrated heating and/or cooling.

The invention also relates to a mount and a chute for realizing such a structure, and a process for making a partitioning and/or inner partitioning implementing same.

The present invention will find its application in the field of the building materials. It is related in particular to a new partitioning and/or inner partitioning structure. The invention is related at the same time to the field of the heating systems for closed rooms.

(2) Description of the Prior Art

In this respect, various heating systems applied to a closed room are presently known. Irrespective of the source of energy, heat exchange means are distributed inside this room. In particular, it is known to install in a construction radiators or other heating panels, even devices known as fan convectors, such devices ensuring a transfer of energy from a cold or hot source to a room, either by radiation effect, natural convection or forced convection. There are also known heating and/or cooling floor systems, which consist in integrating into a floor slab heating or cooling means in the form of a network of pipes through which passes a heat transfer fluid, or sheets of heating resistances. In this respect, such sheets of heating resistances are also likely to be integrated under the roof or the ceiling. Actually, though such sheets of heating resistances can be integrated in all parts of a construction, their implementation is reserved to specialized craftsmen and, in any case, the source of energy can only be electric power.

Finally, when the source of energy results from a heat transfer fluid, the heating or cooling occurs, as evoked above, either through panels or other equipment fixed to the wall or inserted on the floor, or through a slab expressly designed for this purpose. As a matter of fact, it is almost impossible to equip an existing construction, in particular within the framework of a renovation, with a heating slab with fluid circulation, so that the renovation of a heating and/or cooling system in a construction can occur only through the installation or the replacement of these heat-exchanging panels referred to as radiators, fan convectors, radiating panels, etc . . . .

Obviously, the connection of these panels to one single heat source raises the problem of integration into a room of the network of pipes necessary to this end. Though there are presently various solutions for making this network of pipes invisible in the new construction, in the case of a renovation it is often visible, or requires, as in EP 0 022 646, to be mounted against the surface, then covered by a surface paneling, which requires space and is not very esthetic. The former embodiments generally relate to heating devices, but none of them is designed as a building material directly usable by the craftsmen.

Therefore, one could note that within the framework of the improvement, thus of the renovation of a building, it is usual to re-examine the subdivision of the space and especially to improve its degree of insulation by means of a cladding on the inner side of the external walls. This cladding is carried out by means of lining panels in the form of plaster boards combined with a thickness of an insulating material such as polystyrene or polyurethane, even glass wool or rock wool.

It is also usual to line these external walls by means of a structure that is usually used for the partitioning of a construction. This structure is comprised of metallic profile bars including mainly mounts the upper and lower ends of which are fixed in rails applied against the floor and the ceiling of the construction. Thus, against this structure, whether on one side in the case of lining panels or on both sides in the case of partitions, can often be applied cladding plates, often in the form of plasterboards or of any composite material.

The structure itself has a certain thickness permitting the installation of an insulating material, whether sound or heat-insulating material. In addition, the mounts are regularly perforated with openings for the passing-through of electrical cable channels, even of other conduits.

Such structures largely proved reliable and are regarded as materials that perfectly meet the constraints of longevity, insulation and mechanical strength.

It is within the framework of a first inventive step that it was contemplated to integrate in such a structure a network of heating and/or cooling elements for the installation of heating and/or cooling in a room, which system has a higher effectiveness than the known radiator-type panels or the like. Indeed, though such radiators are necessarily of reduced size and are better adapted to high-temperature heat sources, the integration of heating systems in partitions or inner partitions permits to define radiation panels with a very large surface improving the heat transfer for a better distribution in a room, this starting from a so-called low-temperature heat source. Therefore, such a solution proves particularly well-suited for the renewable-energy heat sources such as geothermal, solar energy, etc . . . .

SUMMARY OF THE INVENTION

Thus, the invention more particularly relates to a carrier structure for the partitioning and/or the inner partitioning with integrated heating and/or cooling, wherein the structure includes:
- mounts capable of being fixed to the structure of a building and designed for receiving a cladding;
- through-chutes designed capable of being fixed on said mounts;
- and a network of heating and/or cooling elements extending in the whole or part of said chutes.

The invention also relates individually to mounts and chutes for the realization of such a structure.

The invention also relates to a method for creating a partitioning and/or inner partitioning implementing such a structure.

The advantages deriving from this invention reside in that a structure the mounting of which is ensured for creating a partitioning or inner partitioning can receive during this very mounting operation heating and/or cooling elements so as to finally define large radiation panels guaranteeing a perfect homogeneity of temperature in a room without therefore constituting bulky elements in this room as is the case with the usually known radiation panels such as the radiators, fan convectors and the like.

Other objectives and advantages of this invention will become clear during the following description referring to exemplary embodiments given by way of an indication and non-restrictively.

The understanding of this description will be facilitated when referring to the attached drawings.

BRIEF DESCRIPTION OF THE DRAWINGS

FIG. 2 is a view similar to FIG. 1 showing the realization of an inner partition by means of such a structure;

FIG. 3 is a detail view representing schematically the fastening of a chute to a mount;

FIG. 4 is a cross-sectional view of a chute;

FIG. 5 schematically represents, in perspective view, the arrangement of a heating and/or cooling element in a chute, exactly at an end of the latter;

FIG. 6 is a schematic and perspective view of an end protection cover module;

FIG. 7 is a schematic representation of the fastening of such a cover module to a mount;

FIG. 8 schematically represents, in perspective view, the arrangement of a heating and/or cooling element in a chute, in another embodiment of the latter;

FIG. 9 schematically represents, in perspective view, an element of an end protection cover module, in a particular variant of embodiment;

FIG. 10 schematically represents, in perspective view, another element of an end protection cover module, in the variant of FIG. 9.

DETAILED DESCRIPTION OF THE PREFERRED EMBODIMENTS

Figure 1:
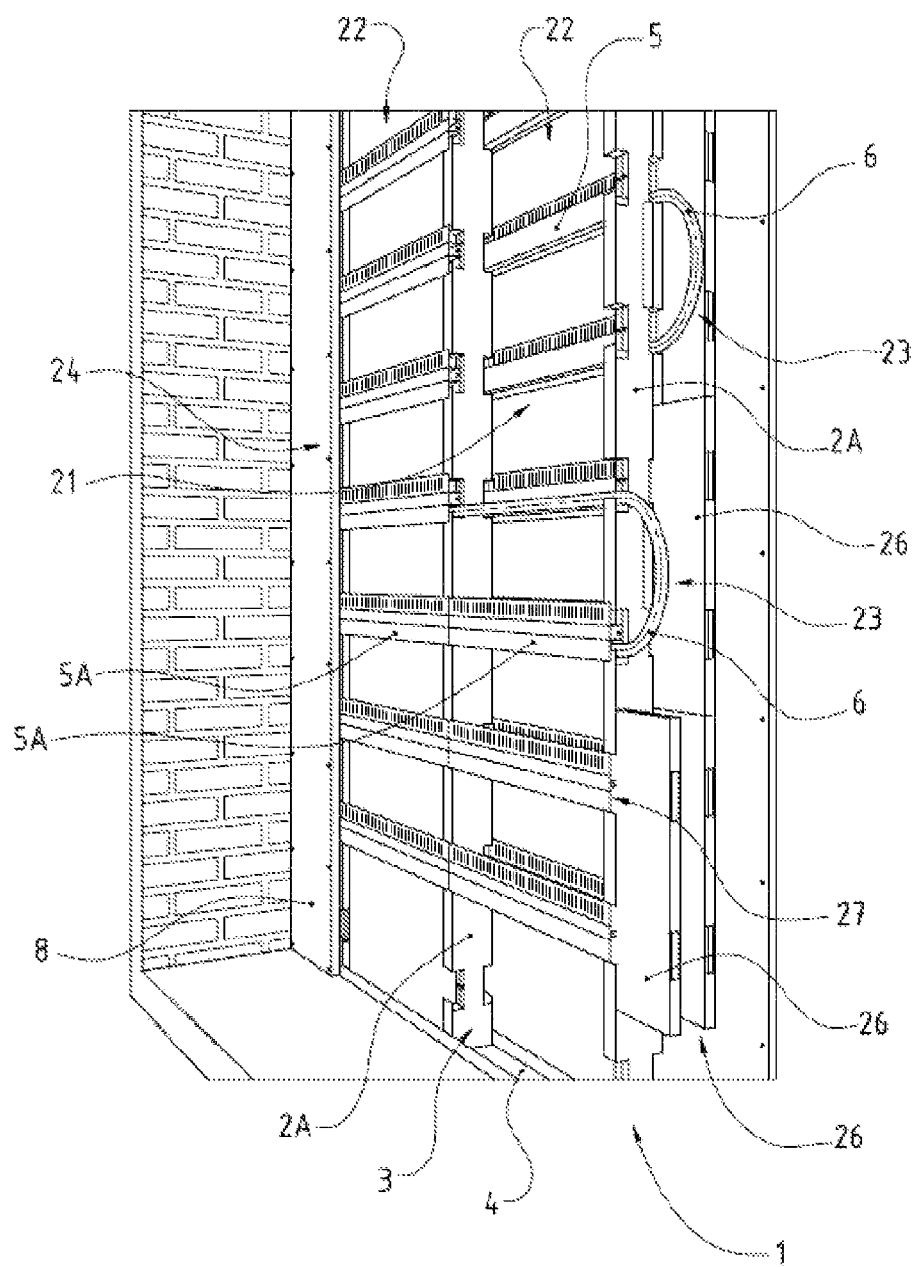
FIG. 1 is a schematic representation, in perspective view, of a partition made from a structure according to the invention.

In the following description, reference is made to the figures of the attached drawings.

The present invention is related to the field of the structures for partitions or inner partitioning.

In particular, the invention relates to such a structure 1 with integrated heating and/or cooling.

Thus, according to the invention, this structure is defined by mounts 2 that, as shown in FIGS. 1 and 2, are designed capable of being made integral with the structure of a building.

Thus, within the framework of a partitioning, but also, why not, of an inner partitioning as can be seen in FIG. 2, the upper and lower ends 3 of these mounts 2 can be maintained with respect to the existing structure of a building using a fastening rail 4. Thus, the latter can adopt a simple U-shape in which will be able to be inserted, by interlocking, the end 3 of a mount 2 to be maintained in position. However, as will become clear hereafter in the description, within the framework of an inner partitioning, said mounts 2B can be designed capable of being fastened directly to the existing frame.

The structure also includes cross-members, designed in the form of profile bars, here referred to as through-chutes or through-gutters 5, designed capable of being fastened to the mounts 2, knowing that such chutes are designed capable of receiving a network of heating and/or cooling elements 6. These chutes 5 are used for supporting and protecting these heating and/or cooling elements 6, and have the advantage of being light and easy to be implemented, compared to the prior art in the field of the renovation implementing large-surface panels.

The fact that chutes 5 are through-chutes with respect to the mounts 2 is a big advantage, both in terms of rigidity and size of the structure 1 thus formed. The structure 1 is thus a carrier or self-carrier structure, i.e. independent from the parallel structure of the building, which avoids creating a heat bridge.

Said mounts 2 preferably include, equidistant on at least one of their sides 7, which is in addition designed to receive a cladding 8, one or several interlocking cut-outs 9 inside which said chutes 5 are designed capable of being fixed, in particular by interlocking and/or complementary fastening means 10 such as screw, rivets or the like. This cladding 8 is designed capable of acting as a diffuser for the heating and/or cooling elements 6, the network of which is integrated into the structure 1, and not into the cladding 8 itself.

Thus, according to an advantageous embodiment, said cut-out 9 is designed so as to define, on the side 7 of the mount 2, a coupling rim 11 onto which the chute 5 is designed capable of being inserted.

In this respect, this chute 5 adopts a general U-shape and includes a rear wall 12, a front wall 13, both connected through a bottom 14.

The front wall 13 is folded onto itself, so as to define an interlocking slit 15 through which this chute 5 will be able to be inserted onto the coupling rim 11. As shown on FIGS. 3-4, the interlocking slit is oriented in a plane parallel to the front wall, and the coupling rim 11 is oriented in a plane parallel to the front faces of the mounts.

In addition, this double thickness thus defined by this front wall 13 protects against piercing the heating and/or cooling element 6 that is placed in the chute 5.

Since the heating and/or cooling primarily acts by radiation, it is important to ensure a perfect conduction between said heating and/or cooling element 6 and the cladding panel 8 the structure 1 receives.

Therefore, the chute 5 also includes a radiator element 16. The latter consists of an extension of the rear wall 12 of this chute, this rear wall including a first fold towards the front wall 13, then a second fold so as to define a wing 17 extending parallel to the front wall 13 and in the opposite direction. As shown on FIGS. 3-4, the wing of the radiator element extends in the same plane as the front wall of the gutter. This wing 17, like the front wall 13, is thus applied against the rear side of the cladding 8 the structure 1 receives. It should be noted that this wing 17 can be cut out so as to define a succession of fins 18 favoring the heat exchange. These cut-outs also permit to improve the connection by gluing between chute and cladding plate.

As was suggested above, in the case of the design of partitions, a mount 2 can be designed symmetrical with respect to a vertical median plane so as to be capable of receiving, on both sides of the structure 1, a cladding 8, as well as, through this symmetry, of receiving, on both sides, chutes 5 for the integration of heating and/or cooling elements 6.

The mounts 2 as well as the chutes 5 are preferably designed through shaping of a sheet including pre-cuts suitable for defining cut-outs 9, even fins 18.

It should be noted furthermore that in these mounts 2 or chutes 5 can also be provided for openings 19 for the passing-through of fastening means 10 or the passing-through of tools for accessing such fastening means. The cut-outs 9 provided for in the mounts 2 advantageously permit access to these openings 19 and to these fastening means 10.

These pre-cuts are shown in particular in FIG. 3 showing the mounting of a chute on a mount 2B designed for realizing a inner partitioning. In particular and as shown in FIG. 2, this mount, instead of being symmetrical, can include at only one of its sides 7 interlocking cut-outs 9, while through its opposite side 20 it can be defined capable of being applied against, even fixed to, an existing partition.

As can be seen in FIG. 8, in a particular embodiment, the chutes 5 are also designed so as to receive a chute cover 34, having a substantially U-shaped profile, designed capable of extending, by one of its faces 35 forming the bottom of the U and framed by a first 36 and a second 37 wing, the front wall 13 and wing 17 of the chute 5. Such a chute cover 34 is advantageously inserted into the latter 5 by a rotational motion, such as a hinge, then by snapping-in thanks to the elasticity of the first wing 36, on the side of the wing 17 of the chute 5. The second wing 37 is in particular designed so as to close the lower area of the chute 5 that contains a heating and/or cooling element 6. The shape of this lower area of the chute is preferably complementary to that of this heating and/or cooling element 6, and namely in the shape of a semi-cylindrical channel. Advantageously, the second wing 37 enters into contact with the heating and/or cooling element 6, and even also has a shape complementary to that of the latter. These arrangements permit to increase the heat-exchange surface of the heating and/or cooling elements 6 with the structure 1, and to limit the risks of condensation inside the chute 5.

The chute 5 can also be provided, on its rear wall 12, with cut-outs 38 designed to favor the mounting and to permit the ventilation of the chute 5.

The chute cover 34 also permits to delimit in the latter 5 an upper compartment 39, which can advantageously contain further heating and/or cooling elements 6, even electrical cable channels, or other conduits of any type whatsoever.

According to the invention, the heating and/or cooling elements 6 define a network 21 extending fully or partly in the chutes 5.

In this respect, it should be specified that a structure comprised of at least two mounts 2A or 2B, spaced apart by chutes 5, defines a panel 22, as can be seen in FIGS. 1 and 2, knowing that on both sides of such a panel 22, seen in the direction of the through-chutes 5, are preserved, at the level of the structure 1, reversal areas 23, 24, which areas are so defined because they permit the heating and/or cooling elements 6 to pass from one chute 5 to a next chute placed above or below and to form the network 21.

Advantageously, at the level of these reversal area 23, 24, said structure includes end protection covers 25 fulfilling the double function of protecting the heating and/or cooling element portions 6 over their length extending between two chutes 5, but also of ensuring the thermal energy transfer by radiation. The elements 6 are thus protected over their full length either by covers 25 or by the chutes 5.

Preferably, these protection covers 25 are comprised of elementary modules 26 designed capable of extending parallel to a mount 3 at least between two successive chutes 5. Thus, such an elementary protection cover module 26 includes fastening means 27 designed capable of cooperating with at least two interlocking cut-outs 9.

According to an advantageous embodiment, such a protection cover module 26 is in the form of a laterally open U-shaped profile bar and includes a rear wall 28, a front wall 29, both connected by one of their side edges through a bottom 30. On their edge opposite this bottom 30, the rear wall 28 includes, as fastening means 27, at least two tongues 31 designed capable of being inserted against the bottom of an interlocking cut-out 9 in order to be fixed thereon thanks to suitable fastening means such as screw, rivets or the like, knowing that at the level of the front wall 29 and on this same edge opposite the bottom 30, the elementary cover module 26 includes spacing tongues 32 that, by being inserted against the side 7 of a mount 2, permit to preserve between said rear wall 28 and the front wall of this protection cover module a substantially constant distance, without nipping on the heating and/or cooling elements 6.

According to a particular embodiment, the protection cover module 26 is made of several parts, in particular of two parts, a first part, referred to as frame 40, forming the rear wall 28 provided with the fastening means 27, the second part, referred to as cover 41, forming the front wall 29 designed capable of being placed on the first part after the installation of the heating and/or cooling elements 6 and including the spacing tongues 32. The bottom 30 can, in turn, be formed of a succession of folded rims belonging alternately to the first and the second part of the protection cover module 26.

In either embodiment, the rear wall 28 is advantageously provided with a set of cut-outs 42 designed so as to allow an access from behind to the heating and/or cooling elements 6 or to a cable channel or conduit accommodated in the chute 5, or also to fix the latter to the protection cover module 26.

In FIG. 5 can be seen in particular a protection ferrules 33 designed capable of being interlocked onto the projecting edge that can be defined by the sheet forming a mount 2A, 2B in front of an interlocking cut-out 9.

Though the through-chutes 5 protect the heating and/or cooling elements 6 over their full length, this is not the case at the level of the reversal areas 23 or 24 and in the absence of such chutes and such protection ferrules 33 can effectively protect the heating and/or cooling elements 6.

As a matter of fact, in this respect, they can be defined by flexible tubes of synthetic material through which can flow a heat transfer fluid.

From the preceding description should be noted, as a matter of fact, that an operator specialized in the mounting of partitions or inner partitions is perfectly able to install such heating elements without requiring any particular skill in the field of the sanitary heating installations or of use.

The invention has the advantage of permitting the simultaneous carrying out of the mounting operations of the partitioning and the heating/cooling circuit.

Of course, at the level of such a structure 1 according to the invention and in particular between two successive mounts 2A; 2B defining a panel 22 can be integrated an insulating material. In particular, the latter can define a reflecting panel at the rear of the chutes 5, so as to reflect the thermal energy released by the heating and/or cooling elements 6 towards the interior of the room.

Obviously, as regards both the mounts, the chutes or the elementary protection cover modules 26, these can be cut to length. However, a chute 5 is advantageously formed of a succession of chute lengths 5A of a standard length corresponding to the usual distance to be maintained between two successive mounts 2A; 2B. Thus, two chute lengths 5A are designed capable of being placed end to end, substantially at the level of the transverse median plane of a mount 2A; 2B.

In a preferred embodiment, as can be seen in the figures, the chutes 5 are mounted perpendicular to the mounts 2.

Referring again to the cladding 8 such a structure 1 according to the invention can receive, it can be formed in a traditional way by plasterboards, which are screwed by means of self-perforating screws onto said mounts 2A, 2B. The user can choose the distance or/and the pitch of the mounts 2 depending on the topology of the sites, as well as on the sizes of the accessories he has at hand, in particular of the claddings 8, which eventually permits to avoid having to cut them, and thus to save a substantial mounting time. The structure 1 according to the invention permits to have free spaces between the mounts 2, as well as between the chutes 5, which allows perforation and embedding areas.

As was already specified above, the risk of perforating a heating and cooling element 6 by such a screw, during the assembling phase, or by other types of aggressions, later on, is avoided through the particular design of the chutes 5 and the elementary protection cover modules 26.

The heating and/or cooling elements 6 according to the invention can be heat-transfer fluid elements or, in the case of only heating elements, electrical elements.

Within the partition or inner partition, an air space can advantageously be preserved, which then constitutes an air circulation channel for natural or forced convection. The structure 1 includes, namely at the level of the claddings 18, inlet and outlet openings for this air, preferably at the bottom and at the top of the partitions and protected by deflectors. Such convection means create a natural convection in the eventual empty space of the partition. They can namely include forced convection means, for example in the form of a ventilator, namely a radial ventilator. Such an equipment then permits to control the direction of the flow, while permitting, during the heating period, the downward movement of the hot air present at the top of the room towards the floor, and, on the other hand, during the cooling period, the upward movement of the cold air concentrated on the floor towards the ceiling. The homogenizing of the ambient temperature thus obtained increases the comfort and reduces the energy consumption.

The structure 1 can also receive means for diffusing treatment products, in gaseous form or aerosols, such as bactericides, acaricides, insecticides, fungicides, or the like. These diffusion can advantageously be in the form of partition ducts, fixed to one of the hollow elements of the structure, such as the mount 2 or the rail 4, then used as diffusers. These partition ducts, installed firmly in the structure, are provided with means for connecting to a source of treatment products, such as a ferrule provided for example with a valve.

The structure 1 can also receive heat/cold accumulation means. These means can advantageously be in the form of panels capable of storing and gradually providing energy.

Fixed to the elements of the structure and in particular at the rear of the network of chutes, these panels can preferably be made out of a composite material with high latent-heat capacity that can contain phase-shift products.

The structure 1 can also receive heat-exchange means. The latter can be formed of radiator elements fastened at the rear of the chutes, which then favor the heat-exchange for example in the case of an air circulation channel for natural or forced convection. They can also be in the form of an exchanger, namely a plate exchanger, arranged directly into contact with the network of chutes, or indirectly, through radiator elements as mentioned above, permitting for example to heat or cool the air necessary for the controlled natural or motorized ventilation of a room.

The structure 1 can also integrate temperature-control means or/and, in an embodiment reserved for the case of the heating and/or cooling elements 6 with heat transfer fluid, condensation prevention means.

In order to avoid condensation inside the partition as well as on the outer surfaces, this in particular during the phase of bringing to temperature, the difference in temperature between the heating and/or cooling elements 6 and their supporting chutes 5, on the one hand, and, on the other hand, the elements that are at the temperature of the room should be limited: air of the room, cladding plates 18, air of the empty space in the partition, and the elements.

This limitation of variation in temperature also permits to limit the dilatation/contraction phenomena. The temperature-control or/and condensation-prevention means include means for analyzing the physical data, namely ambient-air temperature sensors, cladding plates 18, air of the empty space in the partition, of the first chute 5 at the inlet of the circuit, which represents the coolest point of the partition during a phase of bringing to temperature, even a condensation detector on this same chute.

They include management means, such as a control center controlling regulation means designed capable of controlling the thermal flow circulating in the heating and/or cooling elements 6, namely the flow of the heat transfer fluid circulating in the heating and/or cooling elements 6.

These flow-regulation means can adopt the form of a solenoid valve, or also of a motorized by-pass namely arranged in the partition, or also of a remote control for the station for heating/cooling the heat transfer fluid. Such a by-pass can also permit to reverse the direction of circulation of the fluid, in order to improve the effectiveness of the system and the comfort: during the heating period, the entering of the fluid at the bottom of the partition creates a decrease of the temperature from the bottom to the top; on the other hand, during the cooling period, the entering at the top of the partition creates a decrease of the temperature from the top to the bottom. These same means can also control the motorized ventilation as provided for in the first embodiment. Indeed, the various embodiments can of course be cumulated between them.

In the case of a partition using electric power, an essential element is thermal inertia. Heat should be accumulated at the best cost during the off-peak hours, in order to provide same during the peak hours. In order to increase this inertia it is possible to integrate heat-accumulating elements in the structure 1, applied and fixed at the rear of the chutes 5.

In order to increase the energy effectiveness of a building, it is necessary to use the VMC as well as recovering the heat proceeding from secondary sources. Heating the air coming from the outside or diffusing the heat resulting for example from a closed hearth requires the use of heat exchangers. Such exchangers can be built-in in the structure 1 according to the invention, also applied and fixed at the rear of the network of chutes 5.

In order to implement insulating materials, in particular those that are not rigid, such as glass wool, it is possible to fix specifically suited supports to the structure.

Accumulation means, heat-transfer means and fastening means can thus be integrated into the structure. The chutes 5 are then advantageously designed for receiving such means, and then include supporting or/and fastening means specifically designed for particular equipment, in particular at the level of the cut-outs 10 or/and at the level of the rear walls 12.

What is claimed is:

1. Carrier structure for partitioning and/or inner partitioning with integrated heating and/or cooling, wherein the structure includes:
   at least first and second mounts, each of said mounts having (i) a rear face for fixing the mounts to a building or for fixing a rear cladding to the mounts, (ii) a front face oriented in a direction opposed to a direction of the rear face for fixing a front cladding to the mounts, and (iii) two lateral faces between the rear and the front faces, said lateral faces being oriented in directions opposed to each other;
   at least first and second gutters disposed between said first and second mounts, wherein each of said gutters passes through the first and second mounts from a respective lateral face to the other lateral face of each of said mounts; and
   a network of heating and/or cooling elements extending in at least part of said first and second gutters,
   wherein each of said gutters has a general U-shape and includes a rear wall, a front wall, and a bottom wall connecting the rear and front walls, said front wall being folded onto itself so as to define an interlocking slit oriented in a plane parallel to the front wall and opening toward a bottom of the respective gutter, the slit being fitted onto corresponding protrusions on the front faces of the mounts, wherein the protrusions are oriented in a plane parallel to the front faces of the mounts.

2. Structure according to claim 1, wherein each of said mounts includes at least two recesses, each of said recesses opening on said front and lateral faces, and said gutters are fixed inside said recesses by interlocking.

3. Structure according to claim 1, wherein each of said gutters includes a radiator element forming an extension of said rear wall so as to define a wing extending parallel to said front wall and in the opposite direction.

4. Structure according to claim 1, wherein the first and second gutters have respective extremities located on the lateral face of at least one of the first and second mounts, wherein said lateral face faces away from the other of the first and second mounts, and at least one reversal area is provided on said lateral face between said extremities for the heating and/or cooling elements to pass from the first gutter to the second gutter for forming the network.

5. Structure according to claim 4, wherein said structure includes, adjacent said reversal area, an end protection cover.

6. Structure according to claim 5, wherein said protection cover comprises an elementary module extending parallel to said at least one of the first and second mounts at least between the extremities of the first and second gutters.

7. Structure according to claim 1, wherein at least one of (i) the mounts and (ii) the gutters is made of a folded sheet including openings for the passing-through of fastening means or the passing-through of tools for acceding to fastening means.

8. Structure according to claim 1, wherein the structure includes at least one cladding including air passages for a natural or forced circulation in the structure.

9. Structure according to claim 1, wherein the structure includes heat/cold accumulation means that store and gradually liberate energy, said accumulation means being fixed to at least one of the mounts and gutters of said structure, and said accumulation means comprising a composite material with high latent-heat capacity.

10. Mount for a structure according to claim 1, comprising (i) a rear face for fixing the mount to a building or for fixing a rear cladding to the mount, (ii) a front face oriented in a direction opposed to a direction of the rear face for fixing a front cladding to the mount, and (iii) two lateral faces between the rear face and the front face, said lateral faces being oriented in directions opposed to each other;
wherein the mount includes recesses, each of which recesses opening on said front and lateral faces and including a protrusion on the front face of the mount, for receiving gutters passing through the mount from one of the lateral faces to the other of the lateral faces of the mount, by interlocking of the protrusions with slits opening toward a bottom of the gutters, for the integration of heating and/or cooling elements,
wherein protrusions are provided on the front faces of the mounts for interlocking with slits of the gutters, wherein the protrusions are oriented in a plane parallel to the front faces of the mounts.

11. Mount according to claim 10, wherein the mount has additional recesses opening on said rear and lateral faces for receiving, in both the recesses of the front face and the additional recesses of the rear face, through interlocking, gutters for the integration of heating and/or cooling elements.

12. Gutter for a structure according to claim 1, wherein the gutter is a U-shaped profile bar and includes a rear wall, a front wall, and a bottom wall connecting the rear and front walls, said front wall being folded onto itself so as to define an interlocking slit opening toward the bottom of the gutter for fitting onto a corresponding protrusion of a mount,
wherein the interlocking slit is oriented in a plane parallel to the front wall and opens toward a bottom of the gutter.

13. Method for manufacturing a partitioning and/or inner partitioning with integrated heating and/or cooling, comprising:
mounting a carrier structure according to claim 1;
integrating heating and/or cooling elements into said structure;
applying a cladding to at least one of the front and rear sides of the mounts.

14. Structure according to claim 1, wherein the first and second gutters have respective extremities located on the respective lateral face of each of the first and second mounts facing away from the other of the first and second mounts, and at least one respective reversal area is provided on each of said respective lateral faces between said respective extremities for the heating and/or cooling elements to pass from one of the first and second gutters to the other of the first and second gutters for forming the network.

15. Structure according to claim 14, wherein said structure includes, adjacent each of said reversal areas, a respective end protection cover.

16. Structure according to claim 15, wherein said protection cover comprises an elementary module extending parallel to the respective mount at least between the respective extremities of the first and second gutters.

17. Structure according to claim 1, wherein the network of heating and/or cooling elements includes at least one reversal element which passes from the first to the second gutter so as to form the network.

18. Structure according to claim 17, wherein said structure includes, in an area of said reversal element, an end protection cover.

19. Structure according to claim 18, wherein said protection cover comprises an elementary module extending parallel to one of the first and second mounts at least between respective areas of the lateral face of the mount where extremities of the first and second gutters are located.

20. Structure according to claim 9, wherein the composite material with high latent-heat capacity contains phase-shift products.

21. Structure according to claim 3, wherein the wing of the radiator element extends in the same plane as the front wall of the gutter.

* * * * *